Oct. 7, 1969  A. E. BUTCHER  3,471,604
PREWORKING FILM
Filed Feb. 16, 1966
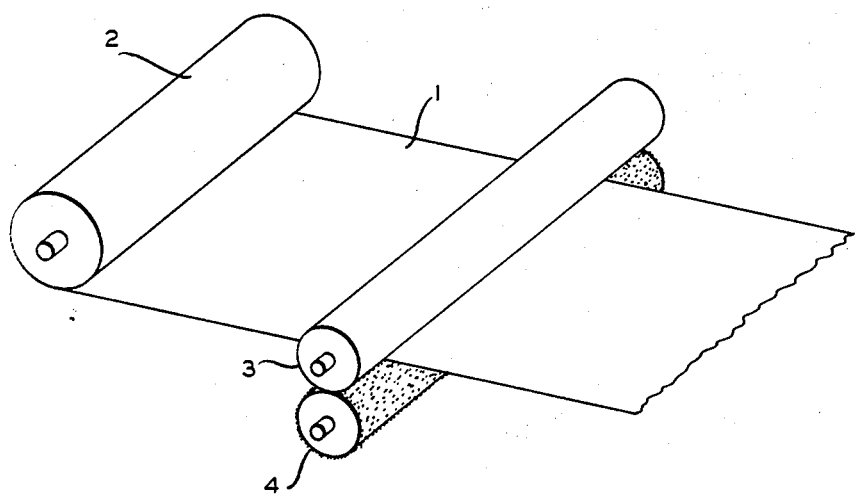
INVENTOR
A. E. BUTCHER
BY Young & Quigg
ATTORNEYS United States Patent Office 3,471,604
Patented Oct. 7, 1969

3,471,604
PREWORKING FILM
Alvin E. Butcher, Bartlesville, Okla., assignor to Phillips Petroleum Company, a corporation of Delaware
Filed Feb. 16, 1966, Ser. No. 527,843
Int. Cl. B29c 17/08, 15/00
U.S. Cl. 264—156            6 Claims

ABSTRACT OF THE DISCLOSURE

A preworked plastic film which is preworked to promote the subsequent fibrillation of the film by a method comprising orienting the film and then roughening at least one surface of the oriented film.

---

This invention relates to a method for preworking a film prior to fibrillation of same and the product thereof.

Heretofore plastic films have been fibrillated, i.e., formed from a film into fibers or net-like structures, of which the more uniform types may comprise relatively thick, elongate stem fibers integrally joined to one another at various points along their length by a plurality of relatively smaller and shorter branch fibers. Fibrillation has been accomplished by various methods such as lateral stretching of oriented film. However, in some cases where thick films, i.e., on the order of 5 to 10 mils, or films formed from tough polymers, e.g., polypropylene, have been employed, many fibrillation techniques have not proven satisfactory in that inconsistent or uneven fibrillation sometimes occurs.

It has now been found that even and consistent fibrillation can be accomplished with thick films and films formed from tough polymers by roughening at least one surface of the oriented film prior to fibrillation of same so that the roughened (preworked) film contains a plurality of indentations including some with pierced areas, i.e., indentations terminated by a hole through the thickness of the film.

Accordingly, by this invention there is formed a preworked, oriented plastic film suitable for fibrillation which contains at least about 400, preferably from about 400 to about 22,500, finite indentations per each square inch of film that is to be subsequently fibrillated.

It is an object of this invention to provide a new and improved method for preworking film to be fibrillated. It is another object of this invention to provide a new and improved film suitable for subsequent fibrillation.

Other aspects, objects, and the several advantages of this invention will be apparent to those skilled in the art from the description, drawing, and appended claims.

In the drawing there is shown a film 1 passing from a feed roll 2 between opposed rolls 3 and 4 which are in pressing relationship with one another and therefore are pressing on either side of film 1. Roll 3 is formed from a resilient material such as rubber while roll 4 has a rough surface that contains a plurality of hard protrusions in a density such that there are at least 400, preferably from about 400 to about 22,500, protrusions per flattened square inch of surface of the roll. Thus, as film 1 passes between the rolls the protrusions on the surface of roll 4 press into the film due to the yieldable nature of resilient roll 3 and thereby either form indentations in film 1 or indentations which pierce through the thickness of that film.

The rough surface of roll 4 can be provided by any means including peg-like protrusions, or sand or emery paper of suitable grit size. For example, sand or emery paper or similar materials having grit sizes from 20 to 150, i.e., from 20 to 150 pointed particles per linear inch, can be employed. In general, the protrusions on the surface of the apparatus which is to form the indentations in the film should have as a maximum dimension from about 0.006 to about 0.05 inch so that the indentations including pierced areas in the preworked film will have a similar maximum dimension across the surface of the film. By maximum dimension it is meant to include the dimensions parallel to the surface of the film to be indented and does not include the height of the protrusions which is perpendicular to the surface of the film to be indented since this height can vary depending upon the thickness of the film and whether substantial amounts or no piercing of the film is desired.

Film 1 can pass between rolls 3 and 4 at a speed which is substantially the same as the peripheral speed of those rolls or the film can be passed between the rolls at a speed which is greater than the peripheral speed of those rolls thereby causing some elongation of the indentations and pierced areas in the film. The film could be passed between rolls 3 and 4 or similar flat apparatus while those rolls are maintained stationary if the size of the protrusions on roll 4 are not so great as to cause shredding of the film, i.e., backing up of film behind one or more of the larger protrusions thereby forming large tears in the film.

Generally, any orientable plastic film can be employed in this process. The film can be in a primarily uniaxially oriented condition with lesser degrees of biaxial or other multi-axial orientation present. The film can be oriented in any conventional manner well known to those skilled in the art including cooling the film to crystallize it and then orienting same by stretching and the like or heating the film to a temperature below that at which the film is in the molten state and then stretching same. By orientation, what is generally meant is deforming, e.g., stretching the film below that temperature at which the film is substantially in the molten state, to thereby increase the strength of the film at least in the direction in which it is deformed.

Generally, films of 1-olefins having from 2 to 8 carbon atoms per molecule which have been oriented can be used. The films can be oriented by stretching before or during fibrillation in at least one direction so that the film after stretching is at least 3 times longer in the direction of stretching than it was before stretching. When film of polyethylene which has a density of at least about 0.94 gram per cubic centimeter at 25° C. is employed the ratio of length in the stretched direction to original length should be at least 4 to 1 and when polypropylene is employed this ratio should be at least 6 to 1. Polymers of 1-olefins can be made in any conventional manner. A particularly suitable method is disclosed in U.S. Patent 2,825,721. The film can be made from the polymers in any conventional manner such as by extrusion, casting, flattening blown tubing, and the like.

Other conventional plastic films that can be employed in this invention include blends of polymers of and copolymers of 1-olefins as abovedescribed with each other and/or with other polymers such as polyamides, polyesters, polyvinyl alcohol, acrylic polymers, polyvinyl chloride, polyvinyl acetate, polyvinylidene chloride, and the like. Of course, homopolymers of the 1-olefins and the other polymers above described can also be employed. A stretch or orientation ratio of at least 3 to 1 can also be employed with these films.

The film can be of any length and width and can vary in thickness from a minimum of that which will produce a substantially self-sustaining film to a maximum which is dictated by the ability of the particular apparatus employed to form a large number of substantial indentations in the film. Preferably, the thickness of the film will vary from about ½ to about 10 mils. Thicker films can be treated by using heavier apparatus, higher pressures, and larger indenting particles; however, risk is run of shredding or piercing the film unduly and this will be deleterious to the subsequent formation of a uniformly fibrillated material. Repeated passes through the same roughening apparatus can be employed to more thoroughly prework the film or to more effectively deal with thicker and/or tougher films.

Thus, the preworked, oriented plastic film suitable for fibrillation as produced by this invention contains at least about 400, preferably from about 400 to about 22,500, indentations including pierced areas in each square inch of the film that is to be subsequently fibrillated and these indentations can vary as to their maximum dimension measured in a plane parallel to the surface of the indented film in the range of from about 0.006 to about 0.05 inch.

EXAMPLE I

A copolymer of ethylene and 1½ weight percent butene-1 based on the total weight of the polymers in the copolymer, the copolymer having a density of 0.95 gram per cubic centimeter at 25° C. (ASTM 1505–63T) and a melt index of 0.3 (ASTM D1238–62T), was blended with polyisobutylene so that the resulting blend contained 30 weight percent polyisobutylene based on the total weight of the polymers in the blend and the blend had a density of 0.94 gram per cubic centimeter at 25° C. (ASTM 1505–63T) and a melt index of 0.2 (ASTM D1238–62T).

This blend was formed into a longitudinally oriented film 2 inches wide and 5 mils in thickness.

The film was pressed against the rough surface of a 50 grit emery cloth, the maximum dimension of the hard particle protrusions on the emery cloth as measured in a plane parallel to the surface of the film being 0.02 inch and the protrusion density of the emery cloth being 2500 protrusions per square inch. The contiguous film and emery cloth sheets were sandwiched between two rubber belts and passed between two sheet metal rolls at a speed of about 15 feet per minute.

The thus preworked film when separated from the emery cloth contained approximately 2500 indentations including pierced areas per square inch of surface of the film, the indentations having a maximum dimension measured in a plane parallel to the surface of the film of 0.02 inch. Some of the indentations in the film were terminated by a hole thereby indicating piercing of the film by some of the protrusions on the emery cloth.

The film was subsequently subjected to lateral stretching in a conventional fibrillation process and fibrillated readily, uniformly, and evenly.

EXAMPLE II

The process of Example I is repeated using 9 mils polypropylene film which is not adequately fibrillated using a conventional fibrillation technique. After preworking according to this invention the polypropylene film fibrillates much more readily than when not preworked.

Reasonable variations and modifications are possible within the scope of this disclosure without departing from the spirit and scope thereof.

I claim:
1. In a method of preworking a plastic film prior to fibrillation of same, the improvement comprising orienting the film so that the oriented length is at least three times the unoriented length and the film is fibrillatable, and roughening at least one surface of said film by indenting, including simultaneously piercing and partially penetrating, said film by applying an external compressive force thereto, each of said indentations having a maximum dimension measured in a plane parallel to the surface of said film in the range of from about 0.006 to about 0.05 inch.

2. The method according to claim 1 wherein said film is composed of one of (1) homopolymers and copolymers of 1-olefins having from 2 to 8 carbon atoms per molecule, inclusive, (2) polyamides, and (3) blends thereof, said film has a thickness in the range of from about ½ to about 10 mils, and fibrillating said oriented and roughened film.

3. The method according to claim 1 wherein the maximum dimension of said indentations including pierced areas measured in a plane parallel to the surface of the film is in the range of from about 0.006 to about 0.05 inch.

4. The method according to claim 1 wherein the density of said indentations including pierced areas in said film is at least about 400 per each square inch of film that is to be fibrillated.

5. The method according to claim 1 wherein said roughening is accomplished by pressing said film between a resilient rubber surface and a hard rough surface.

6. The method according to claim 1 wherein said film is a homopolymer of one of ethylene and propylene.

References Cited

UNITED STATES PATENTS

| 2,442,598 | 6/1948 | Harrison | 264—284 |
|---|---|---|---|
| 3,003,304 | 10/1961 | Rasmussen. | |
| 3,060,515 | 10/1962 | Corbett | 264—284 |
| 3,302,501 | 2/1967 | Greene. | |
| 2,924,863 | 2/1960 | Chavaness | 22—203 |
| 3,038,198 | 6/1962 | Schaar | 18—1 |
| 3,137,611 | 6/1964 | Krolik | 161—109 |
| 3,186,886 | 6/1965 | Etchison | 156—253 |
| 3,199,284 | 8/1965 | Scragg | 57—157 |
| 3,242,035 | 3/1966 | White | 161—168 |
| 3,311,692 | 3/1967 | Baird | 264—293 |

ROBERT F. WHITE, Primary Examiner

R. R. KUCIA, Assistant Examiner

U.S. Cl. X.R.

264—163, 288